Figure 1:
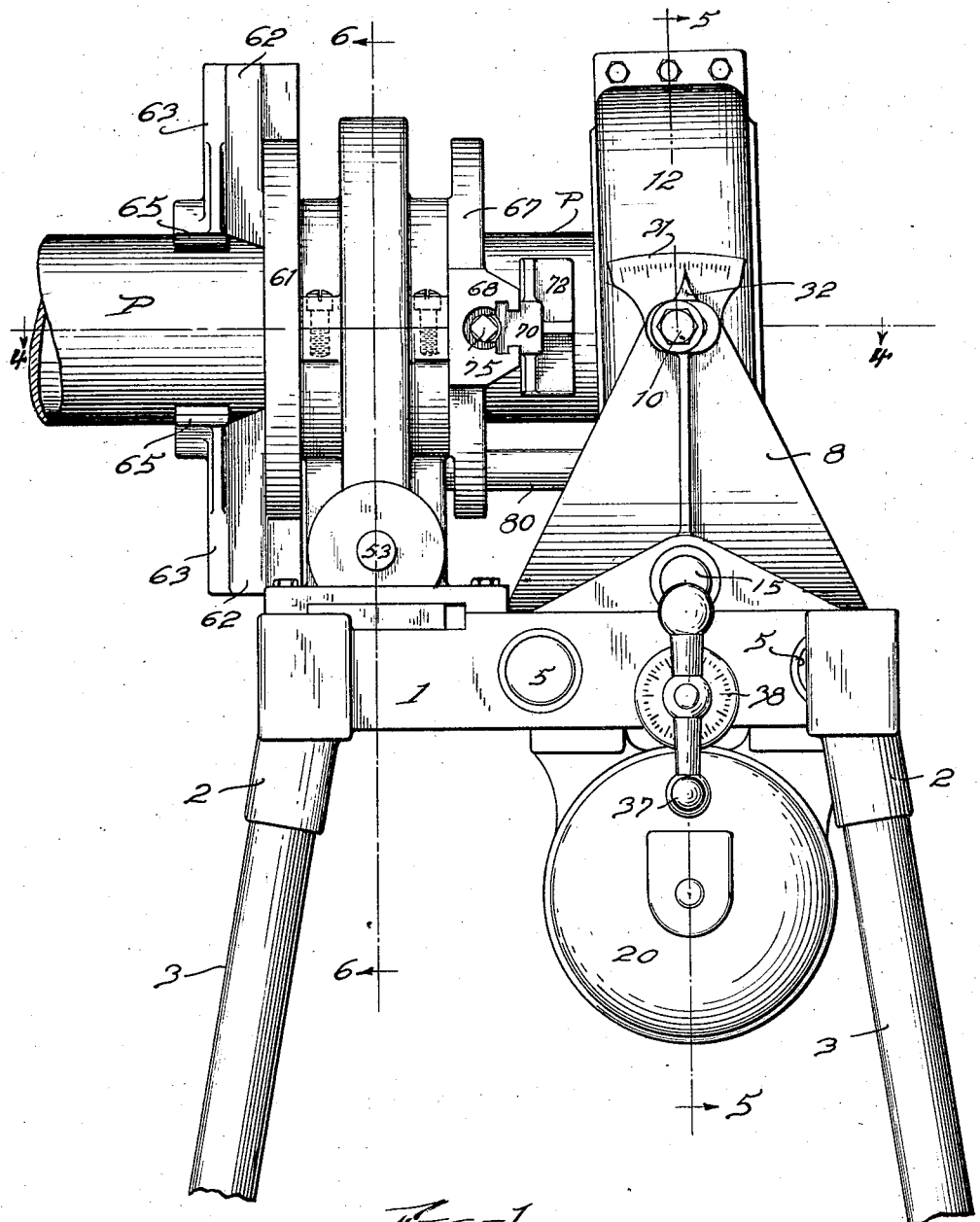

June 19, 1928.

I. W. NONNEMAN 1,674,371

PIPE THREADING MACHINE

Filed Feb. 9, 1922

6 Sheets-Sheet 4

INVENTOR,
Ira W. Nonneman,
BY Bates & Macklin
ATT'YS.

June 19, 1928.  1,674,371

I. W. NONNEMAN

PIPE THREADING MACHINE

Filed Feb. 9, 1922  6 Sheets-Sheet 5

INVENTOR,
Ira W. Nonneman,
BY Bates & Macklin
ATT'YS.

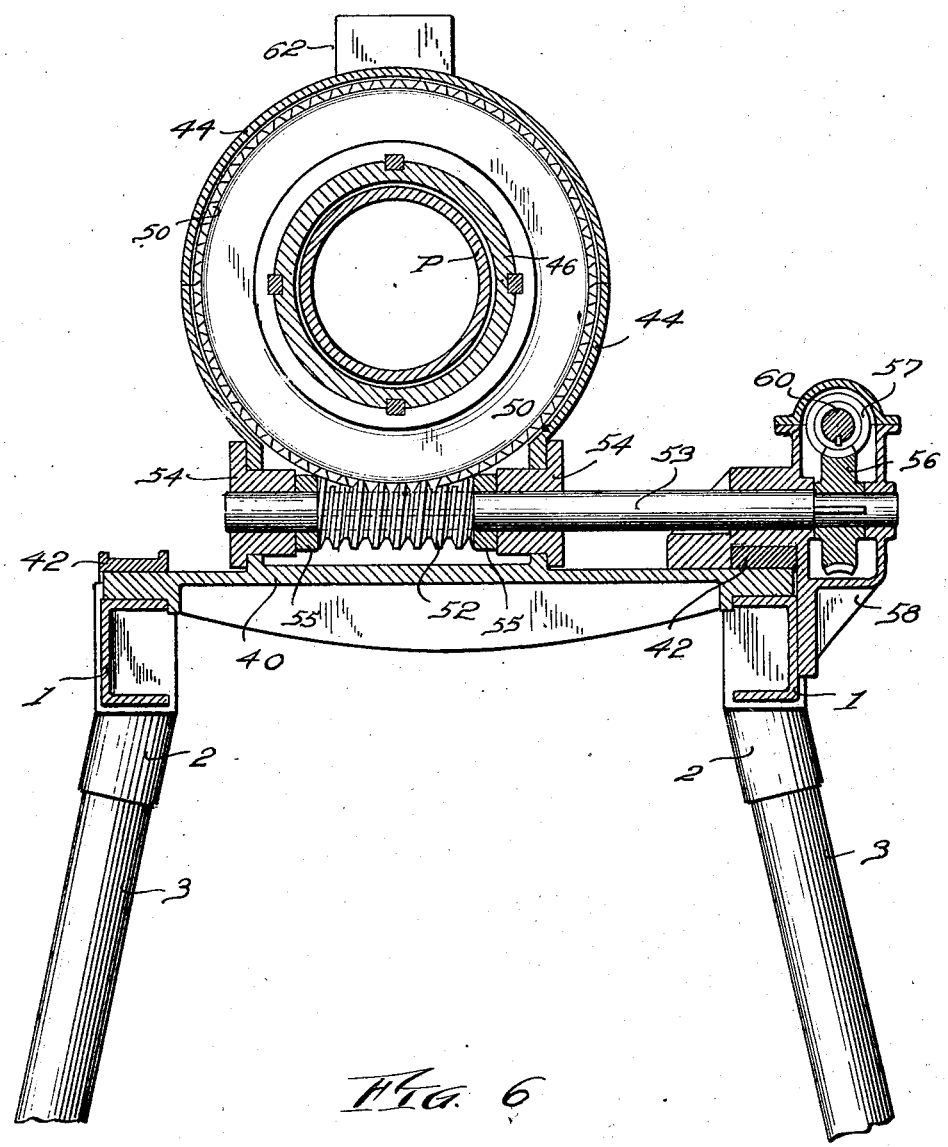

Patented June 19, 1928.

1,674,371

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

PIPE-THREADING MACHINE.

Application filed February 9, 1922. Serial No. 535,369.

This invention relates to pipe threading machines, and has for its principal object the provision of such a machine which will be capable of convenient and quick operation to complete the cutting of accurate threads upon large size pipes. Such a machine is preferably power driven in order to get the highest degree of efficiency, and among other objects is the construction of the machine so that it may have a minimum number of parts which may be easily manufactured and assembled.

My invention contemplates the cutting of pipe threads by the principle of a milling operation, whereby each of a series of revolving cutters comes momentarily into cutting engagement with the pipe for a segment of its circumference, while the pipe is caused to rotate on its own axis and to move longitudinally, to accurately provide the proper pitch of the thread, and whereby the entire series of threads is completed in slightly more than one complete revolution of the pipe. In causing the cutting edges of the thread cutters to pass into and out of engagement with the pipe, in this milling operation, it is desirable that each should follow quite closely for a short distance the curvature of the pipe, rather than follow a convex path or reverse curve with relation to the pipe, wherefore I mount these cutters in a carrier to face inwardly and travel in a circle slightly larger than the pipe, and the carrier may be moved eccentrically to move the cutters into engagement with the pipe. This operation is distinguished from milling operations previously used where the thread cutters are formed about a member rotating on an axis outside of the piece being milled, wherefore each cutter cuts a concave arc into the convex surface being milled.

Another object of my arrangement is to cut smooth threads with a minimum number of movements of the cutters into engagement with the metal, thereby obtaining comparatively higher speed of operation. This arrangement also allows for compactness and results in a convenient and effective arrangement of the operating mechanisms of my machine.

Other objects include the provision of adjustments for various sizes of pipe, the quick removal and positioning of the same in a machine, the accomplishment of convenient and accurate adjustment for any given pitch of thread to be cut, and the attainment of general simplicity of operation.

Still other objects will be made apparent in the following description referring to accompanying drawings, illustrating a preferred embodiment of the invention and the essential characteristics are summarized in the claims.

Figure 2:
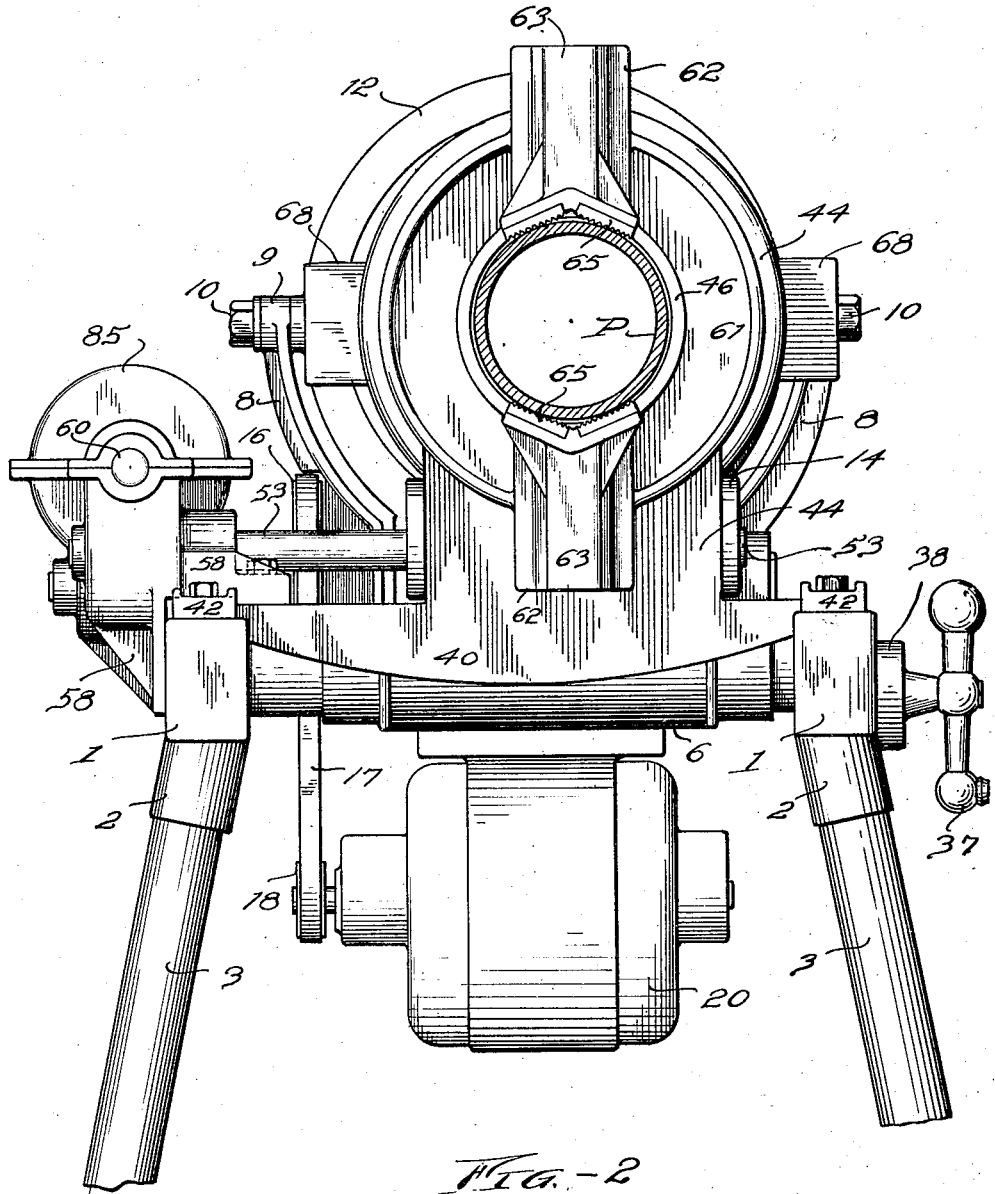
Figure 3:
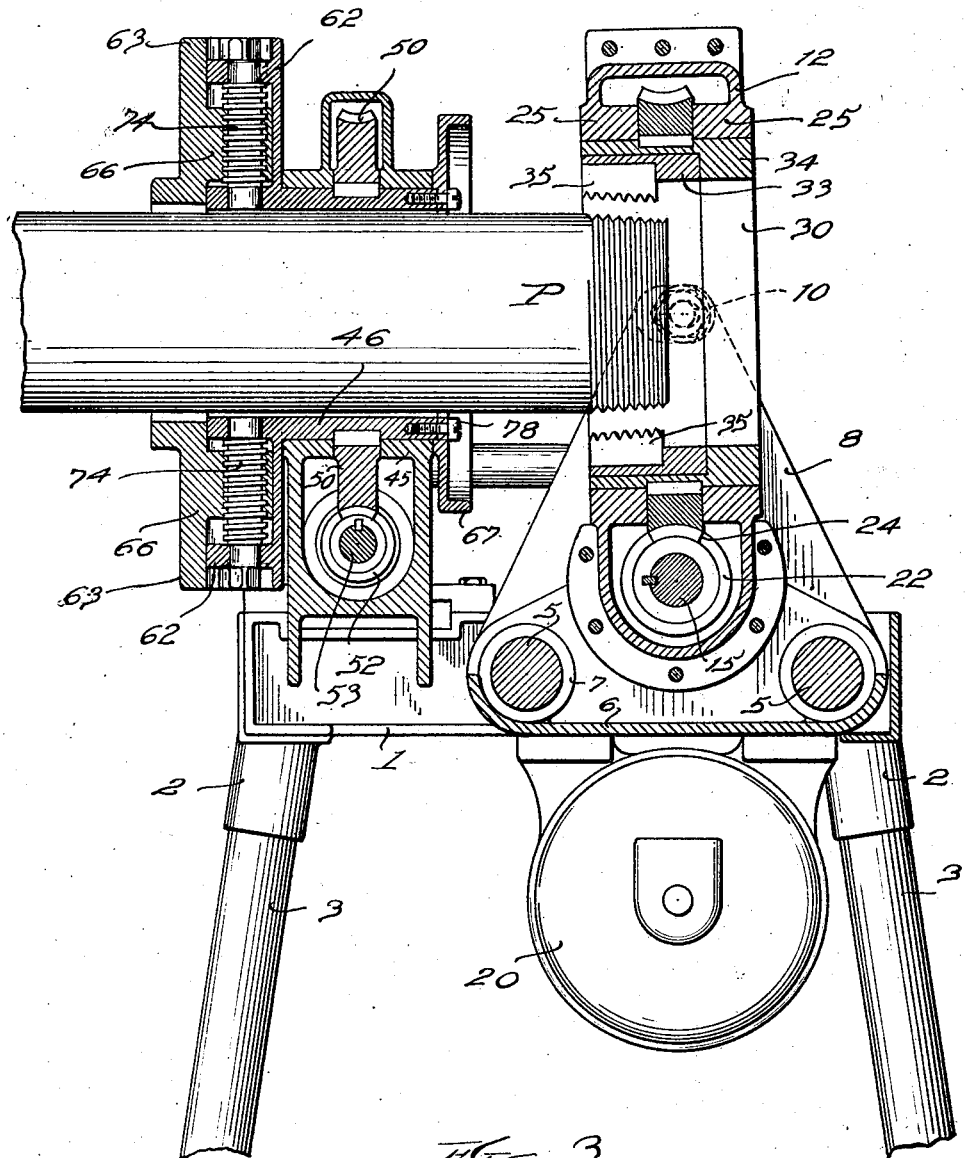
Figure 4:
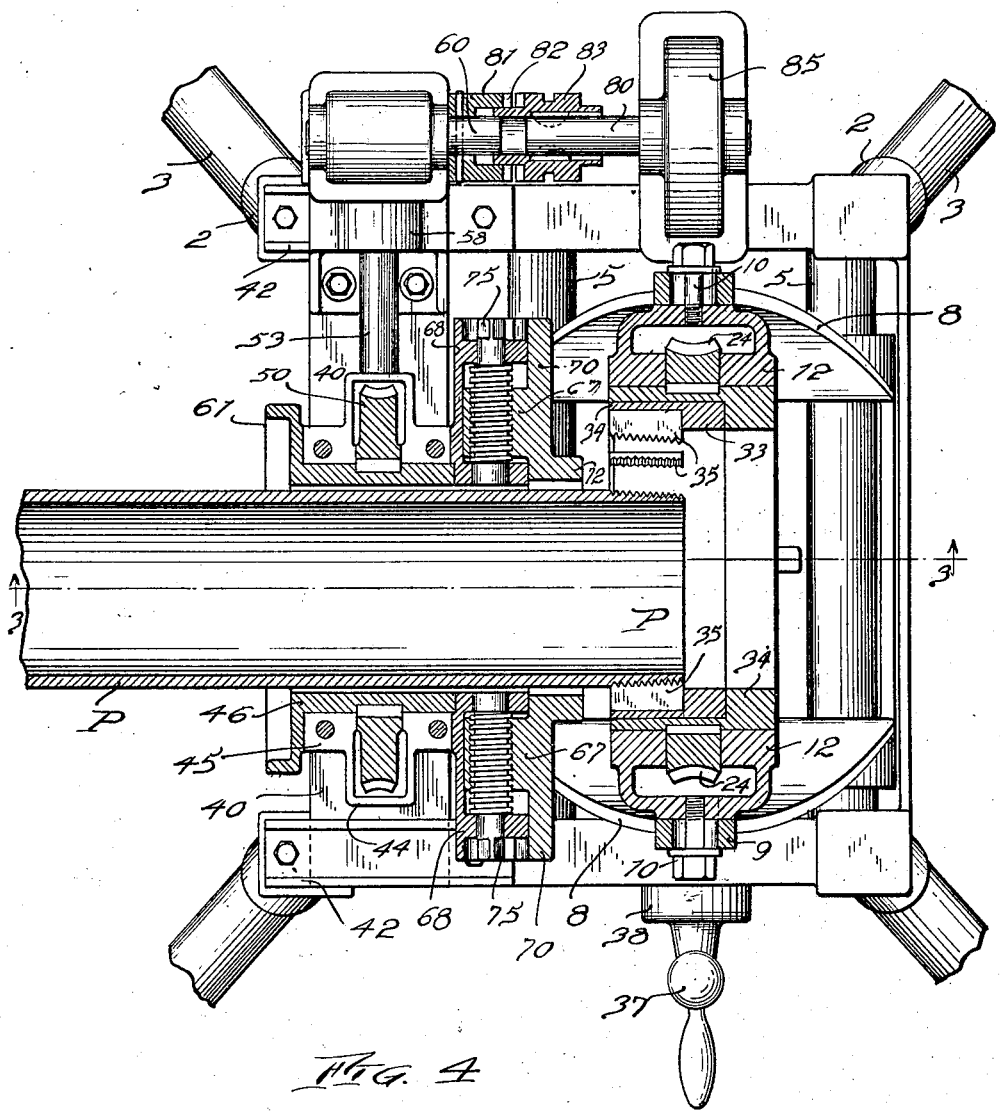
Figure 5:
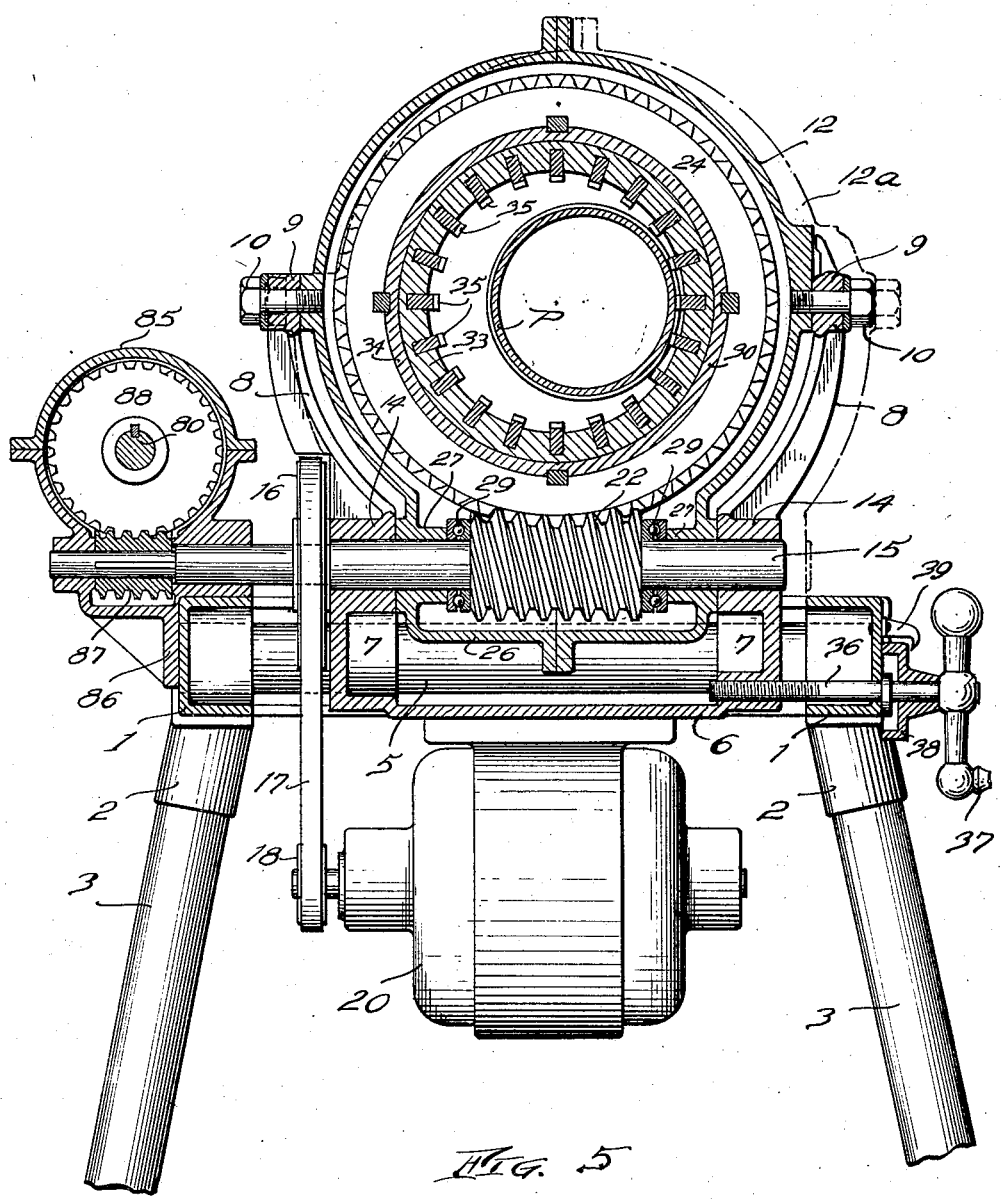

In the drawings, Fig. 1 is a side elevation of my pipe threading mechanism, showing it in operation upon a large sized pipe; Fig. 2 is an elevation looking toward the left hand side of Fig. 1; showing the pipe in position; Fig. 3 is a vertical section taken substantially on the axis of the pipe but offset to pass through the center of the rotatable head carrying cutters as indicated by the line 3—3 on Fig. 4; Fig. 4 is a sectional plane taken substantially on the axis of the pipe and cutting through the pipe holding and milling cutter mechanism as indicated by the line 4—4 on Fig. 1; Fig. 5 is a transverse section taken substantially on the line 5—5 of Fig. 1, some of the parts being shown in elevation for clearness and showing particularly the driving mechanism for rotating the milling cutters; Fig. 6 is a similar view looking in the other direction and being a vertical transverse section taken substantially on the line 6—6 of Fig. 1, showing the driving connection for rotating the pipe.

The machine shown in the drawings, comprises essentially a frame supporting a cutter driving mechanism and motor, and the pipe holding and driving mechanism which is mounted on a slide carried by the frame. Describing these parts more in detail and by the use of reference characters, the frame is a substantially rectangular casting designated 1, (shown as open at one side) provided with sockets 2, at the corners, which are shown as receiving supporting legs 3. Extending transversely of the frame are shown heavy rods 5 fixed at their ends into sockets on the frame. These serve as braces for the frame and as supports upon which are slidably mounted a cutter mechanism including a casting consisting of a web 6, bearings 7, and upwardly extending brackets 8 shown as curved outwardly and each tapering inwardly to a supporting boss 9, having an elongated opening through which extend a bolt 10, threaded into an annular housing and bearing member 12 for the cutters and their driving means. The brackets 8 carry bearings 14 for a shaft 15, extending substantially parallel with the slide supports 5, and having a pulley 16 rigidly keyed thereto, shown as driven by a belt 17 from a pulley 18 on the armature shaft of a motor indicated at 20, and shown as rigidly mounted on the web of the casting 6.

Intermediate the bearings 14 on the shaft 15 is a worm 22 engaging the teeth of a worm gear 24, shown as mounted between annular flanges 25 of the housing 12 and embracing and keyed to the rotation cutter carrier 30. The lower side of the housing 12 is provided with a downward extension 26 surrounding the worm gear and having bearings 27 embracing the shaft 15 at each side of roller bearings 29 which receive the thrust of the worm 22.

It will be seen that the supporting bracket members are connected to the housing 12 at opposite sides, on a line with the axis of the pipe carrier, by the bolts 10 extending into the housing. This support and housing, worm and worm gear, shaft, pulley and driving belt, as well as the motor, are thus all carried as a unit upon the slide supports 5, these may be shifted to bring the cutters 35 into engagement with the pipe P, and away from the same, by transverse movement sliding along the supports. To so move the cutters and driving mechanism toward and away from the pipe, I have shown a screw 36 threaded into the casting 6 and provided with a rotating handle 37 rigid with a graduated disk 38, which by the use of a pointer 39 may indicate accurately the positions of the cutters and the amount of feed given them.

The cutters are shown as consisting of chaser-like members having a cutting edge on one side and formed to cut a plurality of threads at once. These are rigidly mounted in suitable supports such as a ring 33 removably fitted and keyed into a sleeve 34, in turn keyed to the ring which forms the worm gear 24, and rotatable in the bearings formed in the housing member 12. This entire housing and cutter carrying mechanism may be swung about the axis of the shaft 15 and secured in position somewhat at either side of a plane at right angles to the axis of the Pipe P by means of the bolts 10; the elongated openings in the bosses 9 permitting this movement. This tilting of the cutter carrier is to cause the cutters to rotate in a plane corresponding to the angle of the pitch of the thread being cut, as will be hereinafter more fully described. Adjustment at either side of the true radial plane for right or left hand threads is provided for.

For convenience in accurate adjustment, I have shown a graduated arc 31 carried by the housing 12 which may be read by means of a pointer 32 carried by the stationary member 8.

The pipe holding mechanism consists of a double chuck carried by a slide 40 having a bridge portion extending across the frame with its ends mounted in guide-ways formed at 42, supported by the frame members 1. Rising from the slide is a housing 44 having separated bearing portions 45 rotatably embracing a sleeve 46 adapted to surround the pipe and to which is keyed a ring worm gear 50. This gear is driven by a worm 52 on a shaft 53, having bearings 54 mounted in the housing 44, and positioned by thrust bearings 55 on a shaft 53, extending out to the side of the frame and having keyed thereto a worm gear 56 driven by a worm 57. A suitable bracket and housing 58, supports the bearings for the end of the shaft 53 and a shaft 60 carrying a worm 57 is mounted rigidly upon the slide 40 to move with it as it slides longitudinally of the axis of the pipe.

On the left hand end of the sleeve 46 is an enlargement 61 forming a support for guide-ways 62 in which are mounted slides 63 having V-shaped jaws 65 with serrated surfaces adapted to grip the pipe. At the forward end of this sleeve is another annular support 67 having guide-ways 68 for the slides 70 adapted to grip the pipe at right angles to those of the jaws 65, indicated at 72. For convenience in assembling the pipe carrier mechanism the enlargement at the forward end of the sleeve 46 is shown as removably secured thereto by screws 78 (Fig. 3) whereby this collar 46 may be removed by drawing it to the left from the housing bearing 45.

Screws 74 and 75 rotatable but held against axial movement in the guides 62 and 68 respectively, may serve to move the gripping jaws by being threaded through nuts 66 and 67 integral with the jaw slides 65 and 72 respectively. The outer ends of these screws are made angular whereby these slides may be conveniently caused to move inwardly and outwardly to embrace or release the pipe and allowing adjustment for different sizes of pipe.

To rotate the pipe through the gear 50, worm 52 and worm and worm gear 57 and 56 respectively, a shaft 80 is axially aligned with the shaft 60 and adapted to be connected therewith. This connection may be a dental clutch member comprising a collar 81, rigid with the shaft 60 and having teeth 82 adapted to coact with similar teeth on the collar 83, splined to the shaft 80 and shiftable by any convenient means not shown, such for example as a yoke engaging the groove in the collar 83. The shaft 80 has bearings in a housing 85 mounted on a suitable bracket 86 carried by the frame and which also has bearings embracing the shaft 15, which is slidable therein and on the reduced end of which is shown a worm 87 meshing with a worm gearing 88 on the shaft 80. By reason of the reduction in speed at the worm gears 87 and 88, and again at the worm gears 57 and 56 and still another reduction from the worm 52 to the gear 50, the pipe carrier rotates at a very much slower speed than the cutter carrier.

The operation of my machine may be briefly described as follows. The pipe to be threaded is positioned with one end projecting through the pipe holding means and the chuck jaws 65 and 72 are caused to grip it tightly by operating the screws 74 and 75. The cutters 35, which are mounted in the ring holding member rigid with the worm gear 24, are caused to rotate by the motor 20 which drives the worm 22 through the pulleys and belt rotating the shaft 15. The operator then shifts the entire cutter carrier from a position more or less central of the pipe to bring the cutting teeth into engagement with the pipe (thus shifting it say from the position shown in broken lines at 12ª in Fig. 5 to the position shown in solid lines) causing the teeth to engage the pipe and cut into it to the proper depth as may be determined by the graduations on the disk 38. The pipe may then be started to slowly revolve by shifting the clutch member 83, to connect the shafts 80 and 60, thus transmitting the power to the worm and worm gear 57 and 56, rotating the shaft 53 and worm 52 causing the gear 50 to slowly revolve, carrying the pipe carrier and pipe with it. The plane in which the cutters are rotating is that corresponding to the angle of the pitch with relation to the axis of the pipe, and when so presented to the pipe progressively further along result in cutting the spiral corresponding to the proper pitch of the thread.

It will be seen from Figs. 1 and 2, that the cutter carrier is tilted inwardly and if the threads being cut are right hand threads, the cutters are preferably rotating in a counter clockwise direction with relation to Fig. 5 and the entire pipe and pipe carrier are moving toward the cutter carriers as the pipe revolves, by reason of a slope or angle at which the cutters are presented to the pipe. The pipe carrier and pipe being easily slidable axially of the pipe, the establishing of the correct pitch angle automatically feeds the pipe along the cutters whereupon the cutting for something more than a revolution completes all of the threads on the pipe, thus finishing the cutting in a very short time. The reversing of the angle at which the cutters are set from the position shown in Fig. 1 to a corresponding position at the other side of a plane radial with the pipe, would provide for the cutting of a left hand thread. As above mentioned the cutter carrier swings about a shaft 15, and may be set in any desired position by tightening the screws 10, thus rigidly connecting the carrier housing with the rigid brackets 8, without disturbing the relation of the worm 22 and gear 24.

From the foregoing description, it will be seen that I have provided a mechanism for milling the threads upon pipes of large size, the parts of which may be easily manufactured and conveniently assembled in an arrangement such as shown.

The operation of cutting the threads is very simple, reducing to a minimum the chance of spoiling threads by error on the part of the workman.

Experience has demonstrated that milling threads with this is a more rapid operation than cutting of the threads with either hand-driven or power-driven dies.

A further advantage of this machine is that one set of chasers may operate upon a variety of sizes of pipe. Standard pipe threads for pipes of two and one-half inches and larger, are all eight threads to the inch, thus the chaser formed to eight threads to the inch, may operate on various sizes of pipe with this mechanism. It is only necessary to change the angle of the cutter carrier with relation to the axis of the pipe to correspond to the pitch angle for a particular size of pipe to be threaded.

Having thus described my invention, I claim:—

1. In a pipe threading machine, the combination of means for holding the pipe so that it may freely move longitudinally, means for rotating the pipe, a series of cutters, an annular cutter carrying frame in which the cutters are mounted to surround the pipe, means for holding said cutter carrying frame in a skewed position relative to the pipe axis to determine the thread and enable the cutters to feed the pipe longitudinally.

2. In a pipe threading machine, the combination of a series of cutters, an annular cutter carrying frame therefor, a driving member out of coaxial relation with the frame for rotating said frame, said frame being pivoted on the axis of the driving member whereby it may be tipped relatively to the axis of the pipe being cut.

3. In a thread milling machine, the combination of a milling cutter, means for supporting and driving the same, a pipe holding means and means for rotating the pipe holding means to progressively present the surface of the pipe to the milling cutter, said pipe holding means and cutter holding means being movable relative to each other longitudinally and transversely of the axis of the pipe, means for skewing the cutter relative to the pipe, said pipe holding means being moved longitudinally by the cutter.

4. In a pipe threading machine, the combination of means for holding and rotating the pipe while allowing it to move freely longitudinally, a cutter carrying frame having thereon a series of thread milling cutters, means for rotatably supporting said frame, and a driving mechanism for causing the rotation of the cutters, said supporting means being adjustably mounted on an axis in non-intersecting relation to the axis of rotation of the cutters to permit the angle at which the cutters are presented to the pipe to be changed.

5. In a pipe threading machine, the combination with means for holding the pipe, of a series of cutters, an annular frame carrying said cutters in such manner that they may surround the pipe eccentrically thereto, a shaft carrying a worm, a worm wheel on a cutter carrying frame meshing with said worm, said cutter carrying frame being pivoted on the axis of the worm shaft.

6. In a pipe threading machine, the combination of means for holding the pipe, of a series of cutters, a frame carrying the cutters, a driving shaft for the frame, said frame being pivoted on the axis of the driving shaft, and means slidably supporting said frame on an axis parallel with the shaft whereby the frame may be tipped relatively to the pipe axis and may be fed laterally for feeding the cutters into the pipe to the proper depth.

7. In a pipe threading machine, the combination with means for holding the pipe to be cut, a series of uniform cutters, an annular frame carrying the same about the pipe with the pipe eccentric to the axis of the cutter frame, a worm drive for the cutter frame including a shaft transverse of the pipe axis, said frame being pivoted on the shaft axis to tip and determine the pitch, and means for shifting the cutter carrying frame and its driving support laterally to feed the cutters into the pipe.

8. In a pipe threading machine, the combination of a holder for the pipe mounted to slide longitudinally of the pipe, means for rotating the pipe, a series of uniform cutters, an annular cutter carrying frame in which the cutters are mounted, said frame being positioned with the axis of the pipe eccentric thereto, means for rotating the cutter carrying frame including a shaft transverse thereof, means for pivoting the cutter carrying frame on the axis of said shaft whereby it may tip relatively to the pipe axis to determine the pitch of the thread cut, the pipe holder traveling longitudinally during such cutting, and means for feeding the cutter carrying frame laterally to cause the cutters to cut into the pipe to the proper depth.

9. In a pipe threading machine, the combination of a pipe holder adapted to slide to permit the pipe to move longitudinally, a cutter carrying frame having an annular series of cutters facing inwardly and adapted to engage the pipe, means for rotating the frame and means for causing the cutters to be presented to the pipe at an angle corresponding to the pitch of the thread, means for slowly rotating the pipe while it moves longitudinally a distance of one thread.

10. In a pipe threading machine, means for holding and slowly turning the pipe, an annular series of cutters surrounding the end of the pipe and adapted to mill a thread therein, means for rotating the cutters said means being open longitudinally to permit passage of a pipe therethrough and means for adjusting them transversely of the axis of the pipe, said pipe holding means and said cutter holding means being relatively adjustable longitudinally of the pipe.

11. In a thread milling machine, the combination of a plurality of thread milling cutters, an annular rotatable carrier therefor open at both ends, and a holder for said carrier movable transversely of the axis of rotation of the cutters, means for holding a pipe to present it to the cutters and adapted to permit longitudinal movement of the pipe toward the cutters, and means for rotating the pipe when in the holder, while permitting longitudinal movement of the holder.

12. In a pipe thread milling machine, the combination of a plurality of milling cutters, each having teeth corresponding to the number of threads to be milled, an annular carrier in which said cutters are mounted facing inwardly, gearing for rotating said carrier to present the cutters to a pipe, means for holding and rotating the pipe to be so actuated upon, while permitting longitudinal movement thereof by the cutters.

13. A pipe thread milling machine having a series of milling cutters, each having teeth corresponding to the number of threads to be milled on the end of a pipe, a rotatable ring in which said cutters are mounted, a stationary frame supporting the ring, gearing for rotating the ring, and means for holding the pipe to present it to the cutters.

14. A pipe thread milling machine having a series of milling cutters, each having teeth corresponding to the number of threads to be milled, a rotatable ring by which said cutters are carried, a frame supporting the ring, gearing for rotating the ring, means for holding the pipe to present it to the cutters, and a motor mounted on the frame holding the cutter ring and having a driving connection to said gearing.

15. In a pipe threading machine, the combination of two rotatable frames, means for carrying said frames whereby they are relatively movable toward and away from each other, one of said frames being adapted to support a pipe and permit its rotation, the other of said frames carrying thread milling cutters, the relative movement of the frames being effected by the action of the cutters, means for driving the cutters, the cutter supporting frame being positioned at an angle such that the axis of the rotation of the cutters with relation to the axis of the pipe, corresponds to the pitch angle of the threads.

16. In a pipe threading machine, the combination of two rotatable frames, one of said frames being adapted to support a pipe and permit its rotation, the other of said frames carrying thread milling cutters, means for driving the cutters, the cutter supporting frame having an adjustment permitting the changing of the axis of the rotation of the cutters with relation to the axis of the pipe.

17. In a pipe threading machine, means for supporting and revolving a pipe, a series of milling cutters, means for revolubly supporting them, said means being relatively movable longitudinally of the pipe, the cutter supporting means being arranged to cause rotation of the cutters about the axis at such an angle with relation to the pipe as corresponds to the pitch angle of the thread, and the cutters being effective to cause longitudinal movement of the pipe.

18. A pipe threading machine having means for supporting and revolving a pipe, a series of milling cutters adapted to engage and cut a thread upon the pipe as it revolves, an annular frame adapted to surround the pipe and carrying cutters, a gear rigidly mounted on the annular support, a bearing in which the support and gear are revoluble, a shaft and gear for driving the first mentioned gear and about which the cutter carrying frame may be swung to change the angle at which the cutters are presented to the pipe.

19. A pipe threading machine having means for supporting and revolving a pipe, an annular member having a series of milling cutters adapted to engage and cut a thread upon the pipe as it revolves, a gear rigidly mounted on the annular cutter member, a bearing in which the member and gear are revoluble, a gear for driving the first mentioned gear, the cutter carrying frame being positioned so that the angle at which the cutters are presented to the pipe may correspond to the angle of the threads.

20. In a pipe threading machine, means for supporting and revolving a pipe, a series of milling cutters, means for revolubly supporting them, said means being relatively movable longitudinally of the pipe, the cutter supporting means being arranged to cause rotation of the cutters about the axis at such an angle with relation to the pipe as corresponds to the pitch angle of the thread, and whereby the progress of the cutting action may advance the pipe and cutters by reason of the engagement of the cutter teeth at this angle.

21. A pipe threading mechanism including a pipe holding and revolving means, a frame on which the same is movable longitudinally of the pipe, an annular series of milling cutters for forming the threads as the pipe revolves, a worm and worm gear for rotating said cutters to cause the milling operation, a bearing support for the cutters, a gear and shaft for driving the cutter frame and a frame supporting the shaft and mounted on the main frame to slide transversely with relation to the pipe, and means for determining the accurate positioning of the cutters to the proper cutting depth by moving the sliding frame.

22. A pipe threading mechanism including a means for holding and revolving a pipe, a frame on which said means is slidably mounted to move longitudinally in the direction of the axis of the pipe, another frame slidable on the first mentioned frame in a direction transversely of the pipe, an annular series of cutters rotatably carried by the second named frame, gearing for rotating the cutters, and means carried by the second named frame for driving said gearing and movable therewith.

23. In a pipe threading machine, the combination of means for gripping and rotating a pipe, an annular series of milling cutters adapted to surround the pipe, a ring on which such cutters are mounted, a gear rigid with the ring, a worm for driving the worm gear, a shaft on which the worm is mounted, a slide on which the cutter frame and gear are movable transversely of the pipe, a motor carried by the slide and connected with the worm shaft to drive the same whereby the motor may be moved with the mechanism it drives as the cutters are shifted toward and away from the pipe.

24. In a pipe threading machine, the combination of means for gripping and rotating a pipe, an annular support for a series of milling cutters adapted to surround the pipe, a bearing in which said cutter support is mounted, a gear rigid with the cutters, a gear and shaft for driving the cutter gear, a slide by which the cutter bearing is movable transversely of the pipe, and a motor carried by the slide and connected with said shaft to drive the same.

25. In a pipe threading mechanism, the combination of an annular support adapted to surround the pipe, means thereon for gripping the pipe, a bearing in which said support is rotatable and a gear for driving said support, a thread milling cutter adapted to cut the threads on the pipe as the pipe rotates by the milling action of the cutters, a gear for rotating the milling cutter and a motor connected with each of said gears.

26. In a pipe thread milling machine, the combination of a milling cutter consisting of a plurality of thread cutters facing inwardly, an annular member supporting the cutter, a bearing in which said member is rotatable, a worm gear for rotating said member, a worm and shaft for rotating the gear, a motor for delivering power to the shaft, a frame forming a bearing for the cutter carrying members and adapted to swing slightly about the axis of said shaft to change the angle at which the cutters are presented to the pipe, and holding means adapted to hold a pipe with its end inside of the cutter ring, and means for rotating the pipe holding means.

27. In a pipe thread milling machine, the combination of a milling cutter consisting of a plurality of thread cutters facing inwardly, an annular member supporting the cutter, a bearing in which said member is rotatable, a worm gear for rotating said member, a worm and shaft for rotating the gear, a motor for delivering power to the shaft, a frame forming a bearing for the cutter carrying members and adapted to swing slightly about the axis of said shaft to change the angle at which the cutters are presented to the pipe, and holding means adapted to hold a pipe with its end inside of the cutter ring, and means for rotating the pipe holding means and driven from the first mentioned shaft.

28. In a pipe thread milling machine, the combination of a milling cutter consisting of a plurality of thread cutters facing inwardly, an annular member supporting the cutter, a bearing in which said member is rotatable, a worm gear for rotating said member, a worm and shaft for rotating the gear, a motor for delivering power to the shaft, a frame forming a bearing for the cutter carrying members, and holding means adapted to hold a pipe with its end inside of the cutter ring, and means for rotating the pipe holding means.

29. A pipe thread milling machine consisting of a pipe holding means rotatably mounted, a series of thread cutters having teeth corresponding to the number of threads to be cut, a member carrying the cutters and a frame rotatably supporting said member, gears for rotating the member and a shaft for driving the gears, a motor movable with said frame for driving the shaft, gearing connecting said shaft with the means for rotating the pipe holder, said gearing including a sliding connection to permit transverse movement of the cutters with relation to the pipe.

30. A pipe thread milling machine consisting of a pipe holding means rotatably mounted, a series of thread cutters having teeth corresponding to the number of threads to be cut, a member carrying the cutters and a frame rotatably supporting said member, gears for rotating the member and a shaft for driving the gears, a motor movable with said frame for driving the shaft, gearing connecting said shaft with the means for rotating the pipe holder, said gearing including a sliding connection to permit relative longitudinal movement of the pipe and cutters.

31. A pipe thread milling machine consisting of a pipe holding means rotatably mounted, a series of thread cutters having teeth corresponding to the number of threads to be cut, a member carrying the cutters and a frame rotatably supporting said member, gearing and a motor movable with said frame for rotating the same, means for rotating the pipe holder, including a sliding connection to permit transverse movement of the cutters with relation to the pipe and to permit relative longitudinal movement of the pipe and cutters.

32. In a pipe thread milling machine, the combination of an annular series of thread cutters facing inwardly, a rotatable member carrying the same, gearing for driving said member, a motor for supplying power to said gearing, a pipe holding means to present a pipe with its end inside of the cutter, gearing for rotating the pipe holding means, and a clutch between the pipe holding means and said motor to start the rotation of the pipe after the start of the milling operation.

33. A pipe thread milling machine having a milling cutter consisting of a series of cutting teeth to form the full number of threads to be cut, a worm gear for rotating the cutter, a shaft having a worm for driving the gear, a motor for driving the shaft, means for holding and rotating a pipe within said cutter as the milling operation progresses, gearing for driving the rotating means including a worm gear and a worm on said shaft, bearings for said shaft including thrust bearings at each side of said worm.

34. In a thread milling machine, the combination of a rotatable support adapted to embrace the pipe, a rotatable annular support carrying a series of milling cutters, a gear rigid with each support, a gear for driving each of said support gears, said gearing being connected by a clutch, and slidable connections to permit relative longitudinal and transverse movement of the supports.

35. In a thread milling machine, the combination of a rotatable support adapted to embrace the pipe, a rotatable annular support carrying a series of milling cutters, a worm gear rigid with each of said supports, a worm and shaft for driving each of said worm gears, gearing connecting the shafts including a clutch and slidable connections to permit relative longitudinal and transverse movement of the supports.

36. In a thread milling machine, the combination of a rotatable support adapted to embrace a pipe, a rotatable annular support carrying a series of milling cutters, a worm gear rigid with each of said supports, a worm for driving each of said worm gears, and slidable connections to permit relative longitudinal and transverse movement of the supports, gearing including a sectional shaft, a clutch for connecting two parts of the sectional shaft and a worm and worm gear connecting each section of the shaft to one of the first mentioned worms, said gearing progressively reducing the speed between the cutter drive and the pipe holding means, whereby the cutters move many times to one rotation of the pipe.

37. In a pipe thread milling machine, the combination of an annular cutter carrying member, milling cutters carried thereon, and facing inwardly, a bearing for said member dividing intermediately, and a ring gear rigid with the member and projecting between the parts of said bearing, means for holding a pipe, and a motor and a gear for driving the first mentioned gear.

38. In a pipe thread milling machine, the combination of a pipe holding means consisting of a tubular member, a bearing in which it is rotatable and divided intermediately, a gear projecting outwardly between the sections of the bearing, a cutter carrying ring having thread milling teeth projecting inwardly therefrom, a gear on said ring, gears meshing with each of said gears and a motor and shaft for driving the first mentioned gear at different speeds.

39. In a pipe thread milling machine, the combination of a pipe holding means consisting of an annular member embracing the pipe, gripping jaws carried thereby, means for moving the jaws radially to engage the pipe, a worm gear surrounding said member, a shaft, a worm thereon meshing with said gear, a worm gear on the shaft, a worm and shaft driving said last mentioned gear, a worm gear thereon, a worm for driving the last named worm gear, a shaft carrying said last mentioned worm and a motor for driving said shaft, a thread milling cutter having teeth adapted to be successively presented to a pipe, and a worm on the last named shaft for driving said cutter.

40. A pipe thread milling machine consisting of a pipe holding means having jaws for gripping the pipe and a ring gear thereon, an annular series of thread cutting teeth, a ring supporting the same, a bearing in which said ring is rotatable, a gear on said ring, means for supporting said bearing permitting relative transverse movement between the pipe and cutters, a slide supporting the pipe holding means permitting longitudinal movement of the pipe, two shafts, transversely positioned with relation to the pipe and each having a gear meshing with one of said gears, a shaft parallel with the pipe and connected with each of the first named shafts with a worm and worm gear, and a motor for driving the shafts.

41. A pipe thread milling machine consisting of a pipe holding means having jaws for gripping the pipe and a gear thereon, an annular series of thread cutting teeth, a ring supporting the same, a bearing in which said ring is rotatable, a gear on said ring, means for supporting said bearing permitting relative movement between the pipe and cutters, a slide supporting the pipe holding means permitting longitudinal movement of the pipe, two shafts transversely positioned with relation to the pipe and each having a gear meshing with one of said gears, a shaft parallel with the pipe and connected with each of the first named shafts through a worm and worm gear, one of said connections permitting a relative movement of the transverse shafts, and a slidable connection permitting relative longitudinal movement of the pipe holder and cutters, a motor moving with the cutters and having means for driving the shaft geared to the cutter from which the power is transmitted to the pipe rotating means.

42. In a pipe threading machine, in combination means for holding the pipe, a series of cutters, each having a plurality of teeth side by side and adapted to engage the work at longitudinally spaced points, an annular carrier in which the cutters are mounted and adapted to surround the pipe eccentrically thereof, and means for holding said carrier tipped about an axis which is substantially parallel with the normal to the work through the point of cutter engagement, means for rotating the tipped carrier, one of said holding means allowing change in the mutual presentation of the pipe and cutter in a direction parallel with the axis of the pipe.

43. In a pipe threading machine, the combination of means for holding a pipe in a manner enabling it to shift longitudinally, a series of uniform cutters mounted in an annular rotatable frame, each having a plurality of simultaneously acting teeth, and means for holding said frame about the pipe against longitudinal travel but in a skewed position relative to the axis of the pipe to determine the pitch of the thread cut, the pipe being dragged along by the obliquely traveling cutters.

44. In a pipe, threading machine, the combination of a series of cutters each having simultaneously acting teeth spaced the pitch distance apart, an annular cutter-carrying frame in which the cutters are mounted, means for supporting said frame on a transverse axis external of the frame whereby the cutter carrier may be swung to determine the pitch of the thread cut, means rotatable on said transverse axes for driving the frame, and means for holding the pipe in a manner which will enable the camming action of the skewed cutter teeth to feed the pipe.

In testimony whereof, I hereunto affix my signature.

IRA W. NONNEMAN.